(12) United States Patent
Egan et al.

(10) Patent No.: US 7,023,632 B1
(45) Date of Patent: Apr. 4, 2006

(54) MONITORING OF PHENOMENA INDICATIVE OF PTP IN A HARD DISK AND CONTROLLING THE BURNISHING OF HEADS

(75) Inventors: Curtis Egan, Thornton, CO (US); Quinn Haddock, Longmont, CO (US)

(73) Assignee: Maxtor Corporation, Longmont, CO (US)

( * ) Notice: Subject to any disclaimer, the term of this patent is extended or adjusted under 35 U.S.C. 154(b) by 401 days.

(21) Appl. No.: 10/173,561

(22) Filed: Jun. 18, 2002

Related U.S. Application Data

(60) Provisional application No. 60/299,138, filed on Jun. 18, 2001.

(51) Int. Cl.
*G11B 27/36* (2006.01)

(52) U.S. Cl. ..................................... 360/31

(58) Field of Classification Search ................ 360/31, 360/53, 75
See application file for complete search history.

(56) References Cited

U.S. PATENT DOCUMENTS

| | | | | |
|---|---|---|---|---|
| 5,583,712 A * | 12/1996 | Brunelle | ................. | 360/77.07 |
| 5,991,113 A * | 11/1999 | Meyer et al. | ................. | 360/75 |
| 6,195,219 B1 * | 2/2001 | Smith | ................. | 360/66 |
| 6,226,151 B1 * | 5/2001 | Haddock | ................. | 360/236.6 |
| 6,249,393 B1 * | 6/2001 | Billings et al. | ................. | 360/31 |
| 6,275,346 B1 * | 8/2001 | Kim et al. | ................. | 360/31 |
| 6,493,184 B1 * | 12/2002 | Smith | ................. | 360/135 |
| 6,654,191 B1 * | 11/2003 | Ottesen et al. | ................. | 360/32 |
| 6,707,631 B1 * | 3/2004 | Haddock | ................. | 360/75 |
| 6,717,759 B1 | 4/2004 | Himle et al. | ................. | 360/31 |

OTHER PUBLICATIONS

U.S. Appl. No. 10/173,578, filed Jun. 18, 2002.

* cited by examiner

*Primary Examiner*—David Hudspeth
*Assistant Examiner*—Glenda P. Rodríguez
(74) *Attorney, Agent, or Firm*—Myers Bigel Sibley & Sajovec, PA

(57) ABSTRACT

Tools are provided to identify undesired pole tip protrusion (PTP) on a write portion of a read/write head in a hard disk. Such tools may be incorporated in the hard disk. A corrective action arrangement performs a corrective action in response to the identification of an undesired pole tip protrusion. The corrective action may comprise burnishing of pole tips of a write portion of the read/write head. An asperity read signal condition monitoring circuit monitors asperity conditions from the read signal. The asperity condition may be a high fly write condition, or it may be a thermal asperity condition. A PTP determining circuit determines when a monitored condition is indicative of an undesired PTP condition. A PTP test write cycle may be caused, during which the monitoring circuit monitors either during or right after the PTP test write cycle.

20 Claims, 7 Drawing Sheets

MONITORING OF PHENOMENA INDICATIVE OF PTP IN A HARD DISK AND CONTROLLING THE BURNISHING OF HEADS

BACKGROUND OF THE INVENTION

1. Related Application Data

Priority is hereby claimed to U.S. Provisional Application No. 60/299,138 filed Jun. 18, 2001, the content of which is hereby expressly incorporated by reference herein in its entirety.

2. Copyright Notice

This patent document contains information subject to copyright protection. The copyright owner has no objection to the facsimile reproduction by anyone of the patent document or the patent, as it appears in the U.S. Patent and Trademark Office files or records but otherwise reserves all copyright rights whatsoever.

3. Field of the Invention

The present invention, in certain respects, may relate to the manufacture of hard disks. In other respects, the present invention may relate to burnishing of a hard disk's read/write heads to prevent problems associated with pole tip protrusion (PTP). In other respects, the present invention may relate to methods and systems for determining when a hard disk read/write head is subjected to undesired PTP.

4. Description of Background Information

Hard disks are being manufactured with increased access speeds and storage capacities. Manufacturers of these (present day and future) improved-performance hard disks have decreased the distance between the hard disk's read/write heads and its disk media. As a result, slight variations in the positioning or dimensions of the heads or of the disk media can cause the heads and the disk media to collide. For example, such a collision can be caused by protrusion of the pole tips of the write portion of a given read/write head, a phenomenon referred to as pole tip protrusion (PTP). Systems have been provided that detect for undesired or excessive pole tip protrusion, and take corrective action by burnishing the pole tips of a write portion of a read/write head of a hard disk. Such systems may determine whether a given head is subjected to undesired PTP by looking at errors in the servo field, specifically the variation of the PES position error signal.

SUMMARY OF THE INVENTION

The present invention is provided to improve upon PTP detection and PTP correction systems and methods. This disclosure presents tools that can help disk manufacturers determine the occurrence of undesired PTP. Some of the tools presented capitalize on existing features of the hard disk; such existing features may comprise, for example, the processes provided in a typical hard disk read channel.

In accordance with one aspect of the invention, a hard disk is provided with tools for determining when its heads have been subjected to undesired PTP and for burnishing the pole tips of the write portions of such heads. In accordance with another concurrent or alternate aspect of the invention, PTP is determined by identifying a condition involving aberrations or asperities in the read signal during or shortly after a write cycle. The condition may be a high fly write condition, which is difficult to detect. The condition may also be an indication of thermal asperity.

In certain implementations of the invention, a system or method may be provided for identifying undesired PTP on a write portion of a read/write head in a hard disk. The invention may be directed to a subsystem (or a submethod) which comprises any part of such a system (or method). The invention may also comprise a burnishing system or subsystem for burnishing or otherwise adjusting the dimensions of the pole tips of a write portion of a read/write head in a hard disk. Such a burnishing system or subsystem may comprise a portion for determining when the head is subjected to undesired PTP. The invention may also be directed to computer-readable media comprising encoded information which causes the performance of certain acts in accordance with the above-described systems, methods, subsystems, and submethods.

In one aspect, a system identifies an undesired pole tip protrusion on a write portion of a read/write head in a hard disk. The system comprises an asperity read signal condition monitoring circuit that monitors asperity read signal conditions from the read signal. The asperity read signal condition may comprise a high fly write condition identified by a high fly write monitoring circuit, or it may comprise a thermal asperity condition identified by a thermal asperity monitoring circuit. The high fly write monitoring circuit or the thermal asperity monitoring circuit may be provided within the preamplifier or read channel of a hard disk. A PTP determining circuit determines when a monitored asperity read signal condition is indicative of an undesired PTP condition. The system may further comprise a mechanism for causing a PTP test write cycle. The PTP test write cycle may comprise continuously writing onto the disk media for a predetermined period of time. The write cycle may specifically cause writing of data in the outer diameter portion of the disk media at a high (perhaps highest) data rate with a 2T flaw scan type pattern, or a pattern that produces a worst case condition, (e.g., a DC pattern). A corrective action arrangement may be provided to perform a corrective action in response to a determination of an undesired PTP condition. The corrective action arrangement may comprise a pole tip burnisher. The pole tip burnisher may burnish the pole tips of the write portion of the read/write head corresponding to regions of the media at which the undesired PTP condition was identified.

The invention may be directed to a pole tip burnishing system comprising the above-described features, and further comprising a burnish controller. The burnish controller may limit burnishing of the pole tips at a write portion of the read/write head as a function of a value produced by the PTP determining circuit. The burnish controller may cause an iterative burnishing process to take place by which the pole tips are burnished an incremental amount and retested for an undesired PTP condition, thus creating a more efficient continuous process by which the writer pole tips are precisely burnished and not recessed.

BRIEF DESCRIPTION OF THE DRAWINGS

The present invention is further described in the detailed description which follows, by reference to the noted drawings, by way of non-limiting exemplary embodiments, in which like reference numerals represent similar parts throughout the several views of the drawings, and wherein.

DETAILED DESCRIPTION

Figure 1:
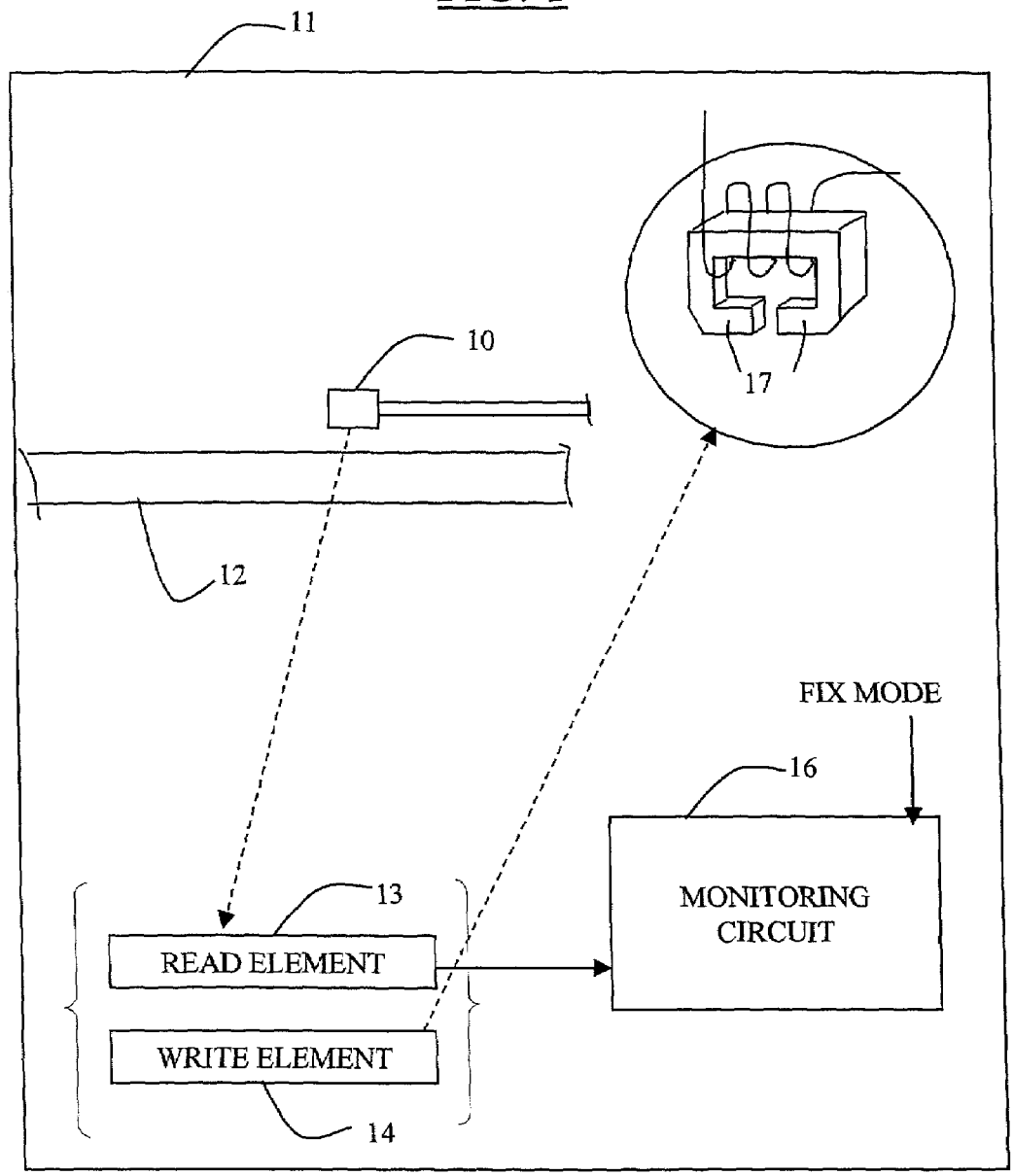
FIG. 1 is a schematic diagram illustrating certain elements of a hard disk, provided with a monitoring circuit for monitoring for PTP.

In the embodiments that follow, a hard disk is provided. That hard disk may comprise a unitary housing, and within that housing, a number of elements may be provided, including an input/output interface, a cache buffer memory, a controller, disk RAM, and disk ROM. In addition, the hard disk may have, within the same unitary housing, a spindle motor, a servo, disk media, and read/write heads. A motor control circuit is typically provided for controlling the spindle motor, and a servo control is typically provided for controlling the servo. In addition, read/write electronics and a read/write channel are each provided for facilitating the transfer of information to and from the disk media.

A hard disk may be provided, which contains a complete subsystem for determining when there is an undesired PTP in the write portion of a read/write head and for taking corrective action upon the indication of such an undesired PTP condition. The hard disk may contain, within its unitary housing, a mechanism for automatically causing the burnishing of the pole tips to prevent the further occurrence of the PTP condition for the given head from which it was detected. Alternatively, hard disks may be provided which contain the elements for identifying the presence of an undesired PTP condition for a given read/write head as a part of a test mode, and a corrective action system (e.g., a burnishing system) may be provided which is separate (or separable) from the hard disk, e.g., so such can be utilized only during the initial setup or manufacture of the hard disks. Such a corrective action system may be provided only for the manufacture of the hard disk, and may not be provided as part of the resulting hard disk after it is fully assembled.

In accordance with one embodiment, a system may be provided for identifying undesired pole tip protrusion on a write portion of a read/write head in a hard disk. As noted above, the system may be within the fully assembled hard disk. The system comprises an asperity read signal condition monitoring circuit that monitors asperity conditions from the read signal, and a PTP determining circuit to determine when a monitored asperity read signal condition is indicative of an undesired PTP condition. Alternatively, a system may be provided for identifying undesired PTP on a write portion of a read/write head in a hard disk. Such a system may comprise a high fly write monitoring circuit that monitors high fly write (HFW) conditions of the read/write head. In addition, a PTP determining circuit may be provided in such a system to determine when a monitored HFW condition is indicative of an undesired PTP condition.

Another type of system may be provided for identifying undesired pole tip protrusion (PTP) on a write portion of a read/write head in a hard disk. Such a system may comprise a thermal asperity monitoring circuit and a PTP determining circuit. The thermal asperity monitoring circuit monitors for thermal asperity, while the PTP determining circuit determines when a monitored thermal asperity condition is indicative of an undesired PTP condition.

Any of the above-described systems may be further provided with a corrective action arrangement to perform a corrective action in response to the PTP determining circuit determining that the undesired PTP condition exists. The corrective action arrangement may comprise a pole tip burnisher (or a media surface burnisher).

The invention may be directed to a pole tip burnishing system or process by which pole tips of a write portion of the read/write heads of a hard disk are corrected by burnishing them to prevent future problems with PTP. Such a burnishing system may comprise each of the elements of either of the systems described above, and further comprise a burnish controller which limits the burnishing of the pole tips of a write portion of a given read/write head as a function of a value produced by the PTP determining circuit. The burnishing system may perform an iterative burnishing process for burnishing the pole tips, where the pole tips are burnished an incremental amount and re-tested for an undesired PTP condition before again burnishing the pole tips an additional incremental amount.

Referring now to the drawings in greater detail, FIG. 1 shows a hard disk having a unitary housing schematically depicted by a rectangle 11. Within the hard disk housing 11, disk media is provided, including a stack of disk platters (not shown). A given disk platter 12 is shown in the simplified diagram. For each side of a disk platter, a different read/write head 10 is provided. Each read/write head 10 may comprise a read element 13 and a write element 14. These elements are provided in some of the newer higher-performance hard disks which utilize a traditional U-shaped head for writing data onto the disk while using a magneto-resistive (MR) read element for reading data from the disk media. A monitoring circuit 16 is provided for monitoring for asperity signal conditions from the read element 13, where such asperity conditions are indicative of the existence of a PTP condition in the write element 14. FIG. 1 includes an enlarged portion which shows write element 14 comprising pole tips 17. Write element 14 comprises a U-shaped head made of conductive material. The U-shaped member is wrapped with coils of wire. A magnetic field is generated and transferred to the disk media in accordance with disk drive write signals that are passed through the coils. By changing the polarity of the electric current passed through the coils, the polarity of the field generated is also changed. The pattern of such magnetic conditions is transferred to the surface of the disk media on disk platter 12 to form a pattern which comprises the resulting encoded version of the data to be retrieved at a later point.

Poles 17 are positioned very close to the surface of disk platter 12, and are maintained at a specified distance from the surface of the disk platter 12 by an air bearing. If there is contact, or if the distance between the surface of the disk platter 12 and the pole tips 17 becomes unacceptably small, there can be problems with the disk. The head or the disk media can be damaged, and errors can be encountered when retrieving the data and reading the data from the disk media.

Such contact between the pole tips and the disk media occurs when there is pole tip protrusion. Pole tip protrusion (PTP) can be caused by high frequency writing which causes thermal expansion of the pole tips 17 due to, for example, the combined effects of eddy current heating and coil heating. Such PTP phenomena can cause problems while writing data onto the disk media, such as off track writing, due to frictional forces, as well as high servo PES (position error signal), because the pole tip is dragging the head. These effects could cause drive failure.

Figure 2:
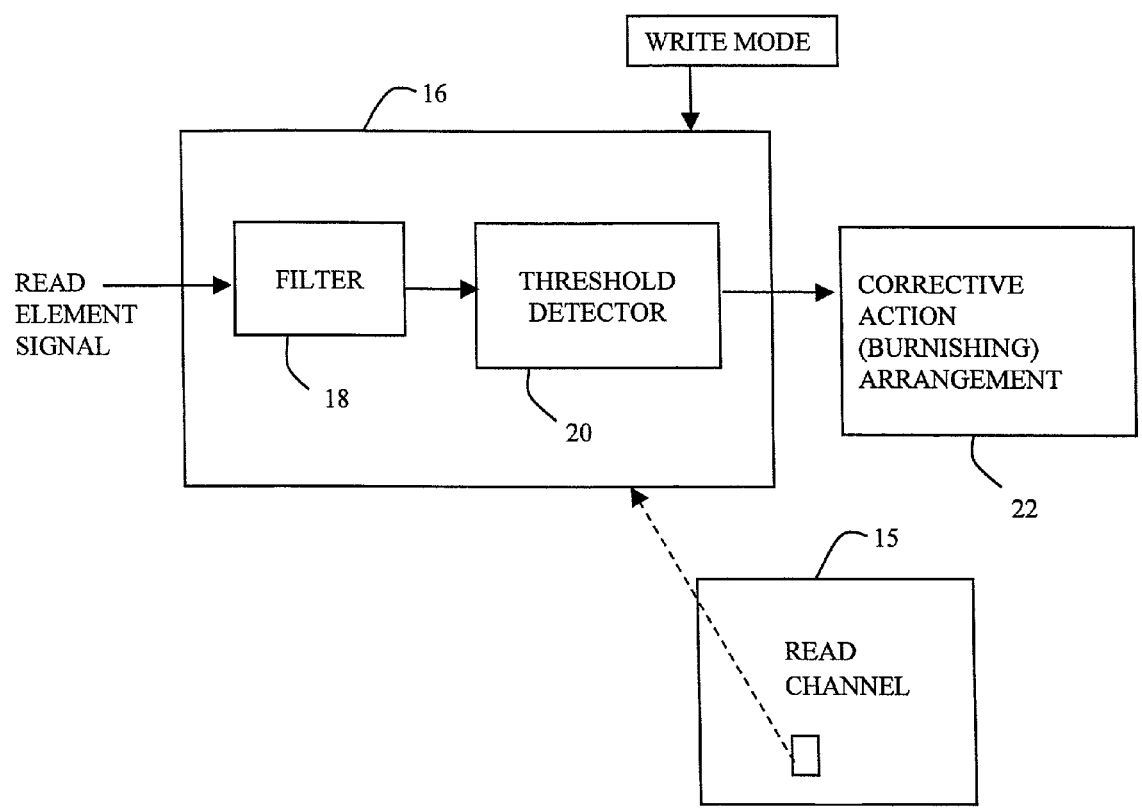
FIG. 2 is a block diagram of an embodiment of a PTP monitoring and correction system.

FIG. 2 shows an embodiment of a PTP monitoring and correction system utilizing a high fly write monitoring circuit 16. The illustrated high fly write monitoring circuit 16 comprises a filter 18 connected in cascade (directly or indirectly) to a threshold detector 20. The illustrated high fly write monitoring circuit 16 detects PTP phenomena by detecting a lower frequency range signal, specifically the air bearing frequency resonance associated with flying height changes that are indicative of a PTP condition for a given read/write head. While the write signal data is being written onto the disk media, a read signal is received by filter 18, which filters out signals unrelated to the lower frequency range air bearing frequency resonance phenomenon. A threshold detector 20 detects when the filtered signals reach a given threshold which is deemed to be sufficient to be indicative of an undesired PTP condition for the given head. Accordingly, filter 18 monitors high fly write conditions by filtering out signals unrelated to such conditions, and threshold detector 20 determines when a monitored HFW condition is indicative of an undesired PTP condition. Threshold detector 20 is rendered active when data is being written to the disk media per a write mode activation input to threshold detector as shown in FIG. 2. Accordingly, the monitoring and correction system shown in FIG. 2. In the illustrated embodiment, such a corrective action arrangement comprises a burnishing subsystem, comprising a pole tip burnisher for burnishing the pole tips of the given read/write head that corresponds to the portions of the disk media that let to the detected PTP condition. In the embodiment shown in FIG. 2, the high fly write monitoring circuit 16 is provided as part of read channel 15 of the hard disk.

The input to filter 18 is a write fault line that is typically already monitored during a write mode of a hard disk. Such a write fault line is known in the art.

The frequency range associated with the air bearing surfaces resonance is between 50 and 500 Khz.

In the illustrated embodiment, the pre-amplifier of the read channel is configured so that it will allow the detection of signals within the 50–250 Khz frequency range, during the write process. The signal input to filter 18 may comprise the TA (thermal asperity) type of read channel signal that is produced during the writing of data to the disk media. Alternatively, a signal may be generated which is indicative of the air bearing surface resonance frequency, and such signal can be input to filter 18.

As noted above, the signal input to filter 18 is a read element signal. The read element is monitored while data is written during a write operation. The thermally induced signal is separated from the magnetically induced signal using filter 18. Threshold detector 20 determines whether the thermally induced signal exceeds a given threshold value, in which case it is deemed to be indicative of an undesired PTP condition. Accordingly, threshold detector 20 can output a warning signal, or a corrective action signal to corrective action arrangement 22. In the embodiment shown in FIG. 1, burnishing is the corrective action. Alternatively, the write operation can be repeated, or another corrective action can be taken.

The read element signal comprises a read-back signal generated during a write operation, which includes a thermally induced signal caused by thermal changes in the MR read head and a magnetically induced signal caused by magnetic flux applied by the write element to the MR read element. Filter 18 filters out the magnetically induced signal.

Figure 3A:
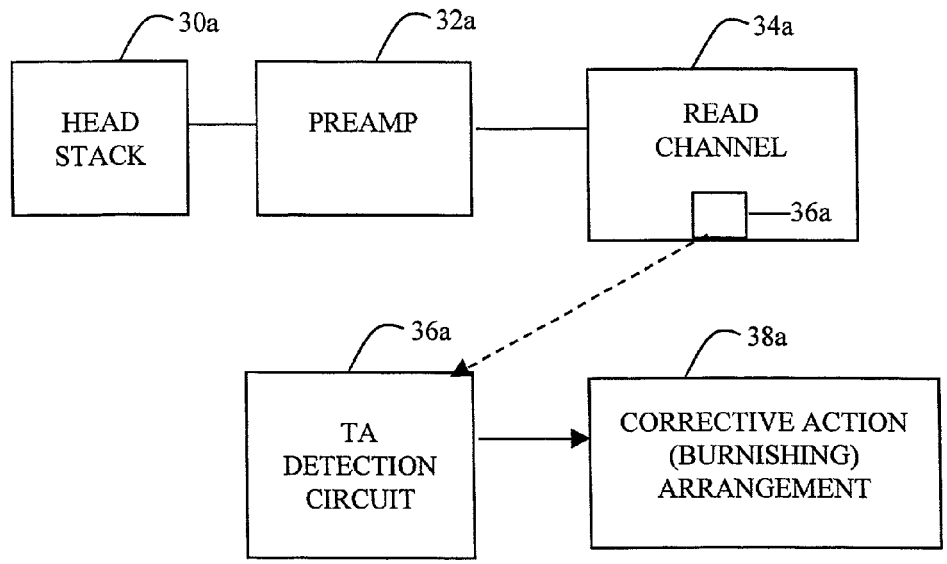
FIGS. 3A and 3B are block diagrams of other embodiments of a PTP monitoring and correction subsystem.
Figure 3B:
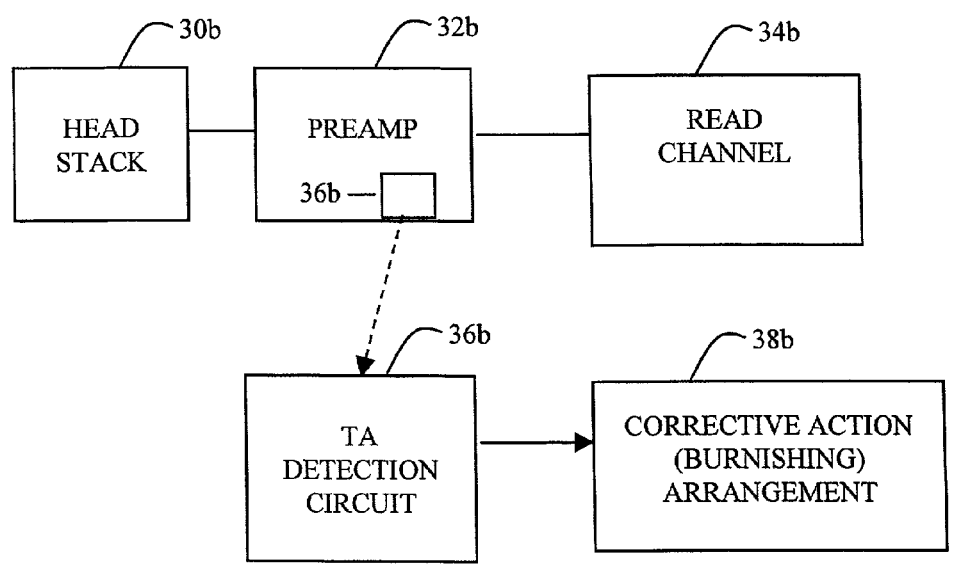

FIGS. 3A and 3B show alternative embodiments of a thermal asperity detection-based PTP monitoring and correction subsystem which may form part of a complete hard disk. The system illustrated in FIG. 3A comprises a head stack 30a coupled to a preamp 32b which is connected in turn to a read channel 34a. A thermal asperity (TA) detection circuit 36a is provided as part of read channel 34a. The output of TA detection circuit 36a is connected to a corrective action arrangement 38a. In the illustrated embodiment, corrective action arrangement comprises a pole tip burnishing mechanism. Similar to FIG. 3A, FIG. 3B shows a head stack 30b coupled to a preamp 32b which is in turn coupled to a read channel 34b. In this embodiment, a TA detection circuit 36b is provided, as part of preamp 36b instead of as part of the read channel. The output of TA detection circuit 36b is coupled to a corrective action arrangement 38b, which in this embodiment comprises a pole tip burnishing apparatus.

The thermal asperity detection approach shown in FIGS. 3A and 3B and the high fly write detection approach shown in FIG. 2 can each allow for feedback to be provided to the burnishing part of the system to control burnishing of the pole tips. Burnishing can be moderated so that the pole tips are not overly burnished, but rather are burnished only when an undesired PTP is indicated by the PTP determining portion of the system.

Burnishing can also be performed on the disk media at portions that correspond to the times and locations at which an undesired PTP condition may be detected. The burnisher may comprise one or a combination of a flying and a contact burnisher. The goal is for the pole tips to be burnished an optimal amount, without resulting in unwanted recession of the pole tips which can produce increased write separation and PW 50.

Figure 4:
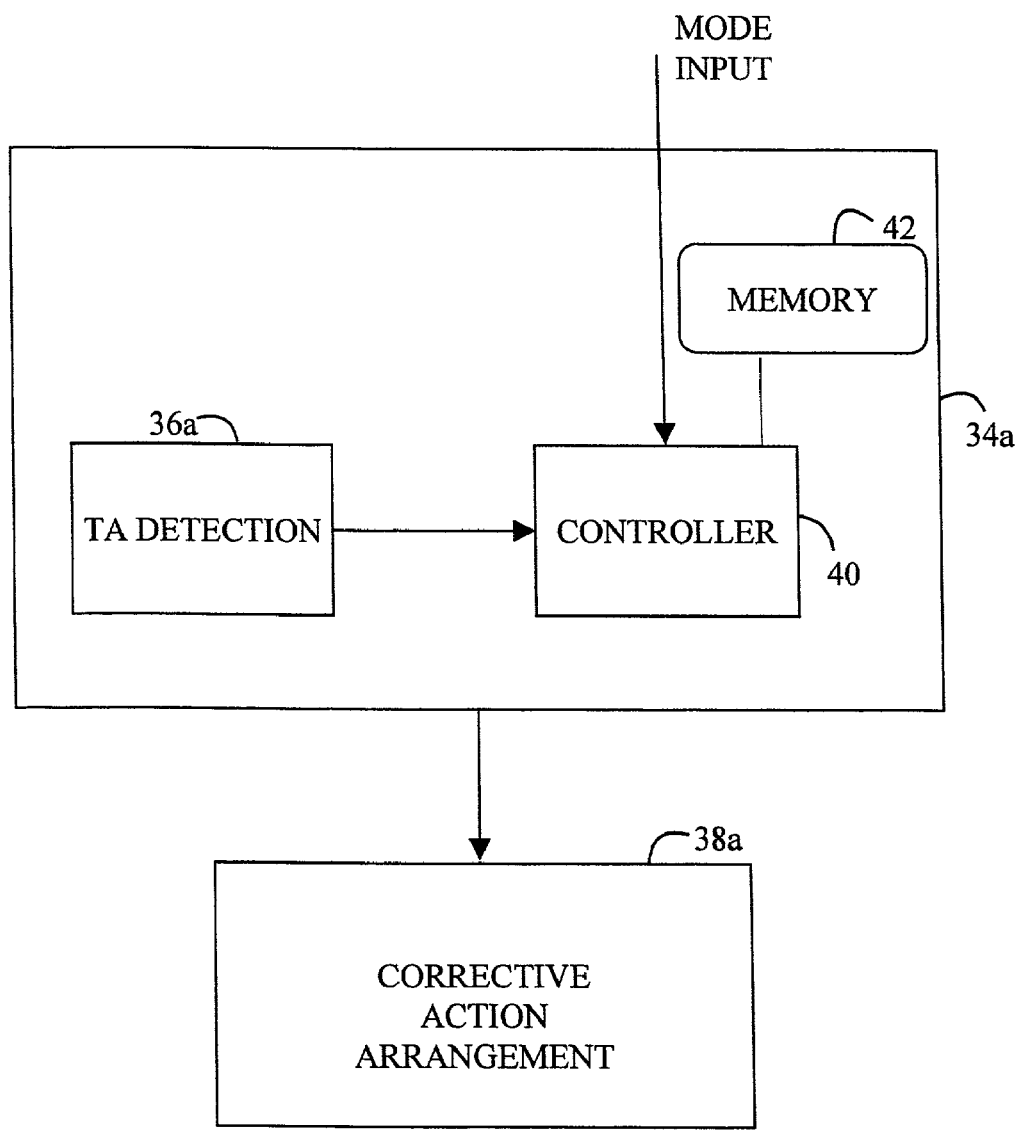
FIG. 4 is a block diagram showing a read channel together with a corrective action arrangement, the read channel comprising PTP monitoring elements using thermal asperity detection.

FIG. 4 shows a read channel 34a which corresponds to the read channel shown in FIG. 3A. The illustrated read channel 34a comprises TA detection circuit 36a, a controller 40, and memory 42, and is coupled to the same corrective action arrangement 38a shown in FIG. 3A. Controller 40 works with memory 42 to carry out an undesired PTP determination process. Controller 40 responds to input information including the mode of the hard disk, as well as the output signal from TA detection circuit 36a, to cause PTP monitoring during a write mode of the hard disk or during a fix or test mode of the hard disk. Depending upon the types of signals detected by TA detection circuit 36a, controller 40 may cause corrective action to be taken by corrective action arrangement 38a, including the burnishing of the pole tips of the write portion of the read/write head.

Figure 5:
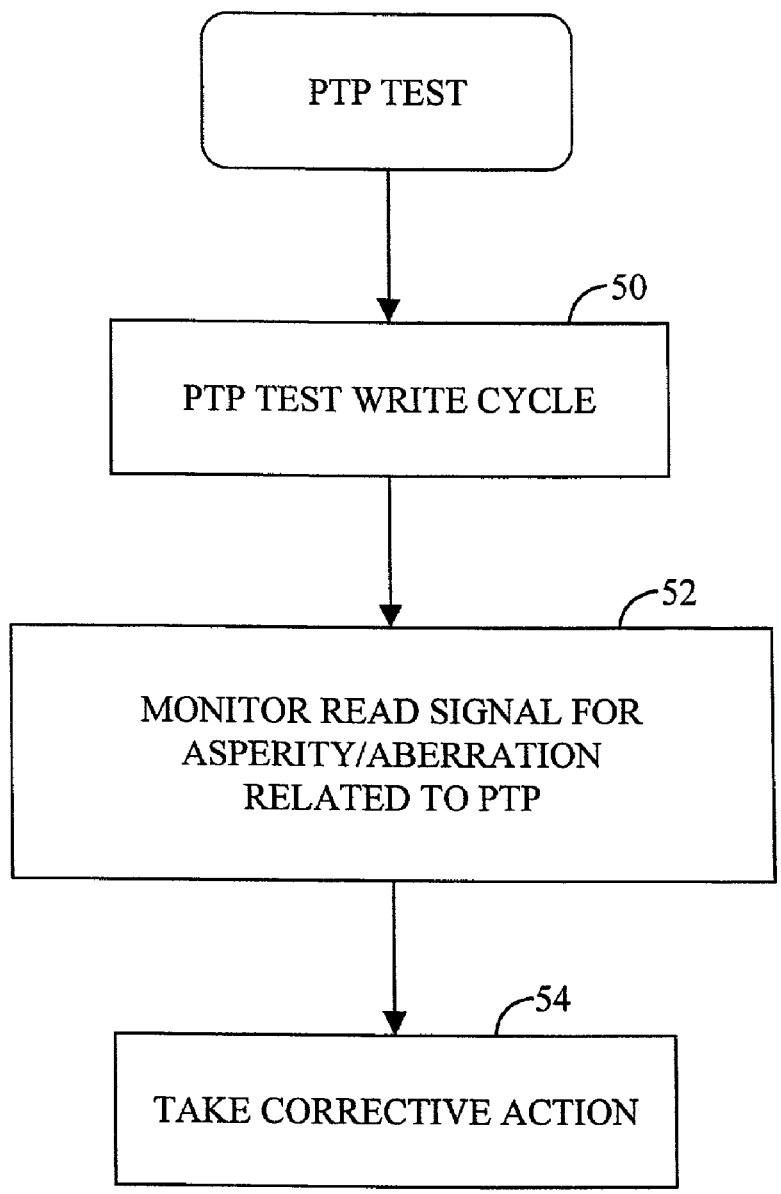
FIG. 5 is a flow chart of a PTP test process.

FIG. 5 shows a PTP test process that can apply to any of the above-disclosed embodiments. Generally, as shown in FIG. 5, when a PTP test is performed within a hard disk, whether the PTP detection is based upon detecting thermal asperity or is based upon monitoring for high fly write signals based upon lower frequency air bearing resonance activity, the test will preferably involve putting the disk media and the applicable read/write head under worse case scenario conditions. Accordingly, in accordance with a first act 50, a special PTP test write cycle is activated, by which the read/write head being tested will write data to the outer diameter portion of the disk media at a highest data rate. In the illustrated embodiment, the pattern comprises a 2T flaw scan type pattern, so that the flux transitions occur at the highest and most demanding rate, causing the most heat in the magnetic core and in the coil.

In a next act 52, the read signal from the read portion of the read/write head is monitored for the existence of an asperity or aberration indication related to pole tip protrusion. When using the high fly write approach, this occurs concurrently with the writing of data to the disk media. When monitoring for thermal asperity, the read signal is monitored shortly after the write cycle is stopped. In act 54, corrective action is taken. Specifically, the tips of the poles can be burnished in small incremental amounts to prevent pole tip protrusion from occurring again. The process may be repeated, in order to cause incremental burnishing of the pole tips to an optimal dimension.

Figure 6:
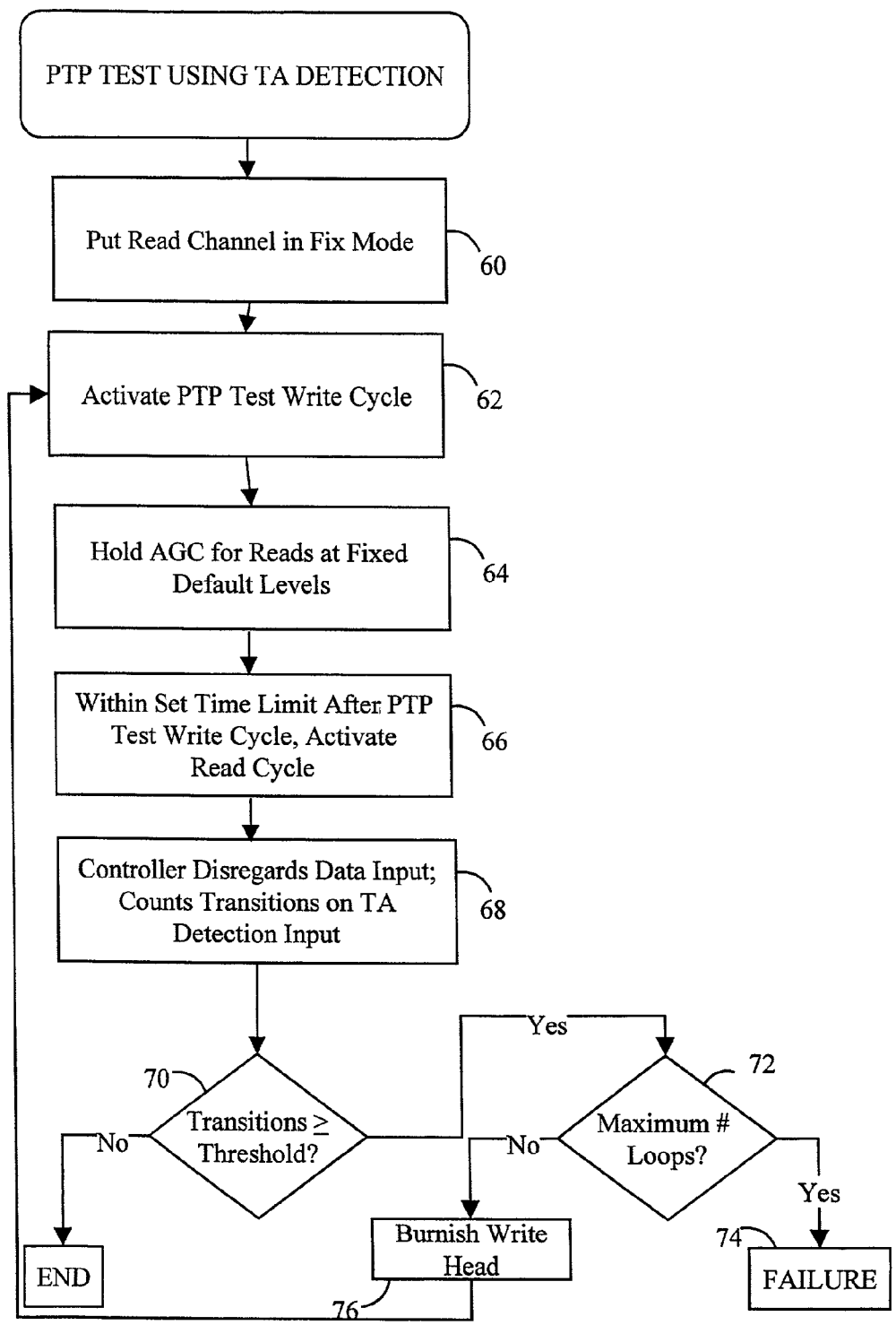
FIG. 6 is a more detailed flow chart of a PTP test process using TA detection to indicate an undesired PTP.
Figure 7:
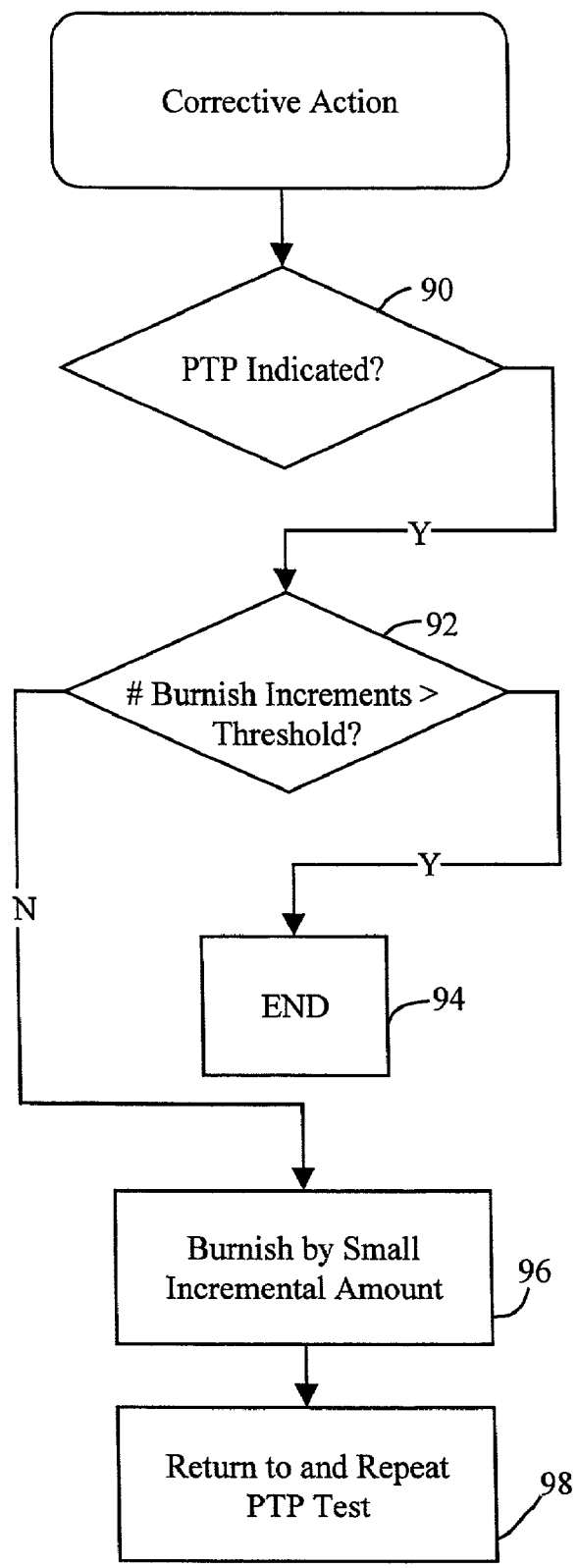
FIG. 7 is a flow chart of a corrective action process involving burnishing of the pole tips of a head when an undesired PTP is indicated.

FIG. 6 shows a more detailed process that may be performed for a PTP test using TA detection. In a first act 60, the read channel is placed in a fix mode. This causes the AGC (automatic gain control) of the read channel to be held at fixed default levels, and results in the read mode being by-passed, which causes the controller to disregard data passed to it. In this mode, the controller is only concerned with transitions on the mode input line (see FIG. 4).

In a next act 62, a PTP test write cycle is activated. As described above, such a write cycle, in the illustrated embodiment, comprises writing data at a high, e.g., the highest data rate, in the outer diameter zone of the disk platter for each read/write head of the hard disk. In the illustrated embodiment, the pattern is a 2T flaw scan type pattern which results in a high energy flux transition, which effectively creates a worst case scenario test on the write portion of the read/write head. That is, by writing data at the highest data rates with such a pattern, the eddy current and the current through the coil windings of the write portion are given values so as to result in heat causing the most pole tip protrusion.

At act 66, within an amount of time after the conclusion of the PTP test write cycle, a read cycle is activated. That is, the hard disk performs an immediate read of data from the read portion of the read/write head. In the illustrated embodiment, this read occurs in the very next data field succeeding from the concluding data field of the write cycle, regardless of the off-track condition.

The write cycle, in the illustrated embodiment, comprises writing data to a number of sectors, preferably a large portion of at least one revolution, which will be sufficient to heat the head to a sufficient temperature. A process may be provided which will cause the write cycle to start over if there is an interruption in the write cycle for whatever reason.

At act 68, the controller disregards data input to it and counts transitions on the thermal asperity detection input. If the transitions are below a certain threshold, then an undesired PTP has not been detected, and the process ends. If the transitions are equal to or above the threshold at act 70, the process proceeds to act 72. At act 72, a determination is made as to whether the process has been repeated beyond a maximum number of times, which would mean that the write pole tips have been burnished up to a maximum number of times. If this occurs, the process proceeds to block 74, which indicates failure to reach an optimum burnishing of the write pole tips in a way that eliminates the occurrence of PTP. If the maximum number of loops has not been reached as determined at act 72, the process proceeds to act 76, where the write head pole tips are burnished by an incremental amount. The process thereafter returns to act 62, where a new PTP test write cycle is activated.

The process may be modified to provide a ramp-up in the length of the PTP test write cycle. If a shorter PTP test write cycle results in an undesired PTP condition, continuing the PTP test write cycle to its maximum continuous length could result in more damage. Accordingly, a ramp-up process may be performed whereby the first PTP test write cycle at act 62 is shorter in time and during each subsequent loop of the process it is gradually lengthened. If no PTP condition is identified at the maximum length cycle, then no burnishing will be required at act 76, as will be determined at act 70.

FIG. 8 shows a flow chart of a corrective action process that may be performed. In act 90, a determination is made as to whether an undesired PTP is indicated. If so, the process proceeds to act 92, where a determination is made whether the number of burnish increments is greater than a given threshold. If so, the process ends, since burnishing has occurred a maximum number of times.

If the number of burnish increments has not exceeded the threshold, the process proceeds to act 96, where the head or the media surface (depending on the type of burnishing system) is burnished an incremental amount. At act 98, the process returns to the PTP test.

The processes described herein are particularly useful for GMR type read/write heads in hard disks.

The processes described herein of monitoring for undesired PTP and taking corrective action, particularly precision burnishing of writer pole tips, will lead to increased reliability of the hard disk and to an improvement in the production yield of the hard disks.

For purposes of the disclosure herein, a computer-readable media may comprise any form of data storage mechanism, including temporary memory such as a RAM, or longer-term storage devices, including ROM, magnetic disks, rewritable optical disks, and so on. Computer-readable media can also comprise hardware or circuit representations of structures or data. The above described system and method embodiments can be implemented with software controlling a general purpose processor or with specialized processing components and circuitry.

While the invention has been described with reference to certain illustrated embodiments, the words which have been used herein are words of description, rather than words of limitation. Changes may be made, within the purview of the appended claims, without departing from the scope or spirit of the invention in its aspects. Although the invention has been described herein with reference to particular structures, acts, and materials, the invention is not to be limited to the particulars disclosed, but rather extends to all equivalent structures, acts, and materials, such as are within the scope of the appended claims.

What is claimed is:

1. A system for identifying and correcting undesired pole tip protrusion (PTP) of a write portion of a read/write head that is configured to transfer data to and from a disk media in a hard disk, said system comprising:

a monitoring and PTP determining circuit that monitors a read signal from the read/write head reading the disk media of the hard disk and determines based on the monitored read signal occurrence of an undesired PTP condition;

a corrective action assembly that comprises a pole tip burnisher and is configured to correct undesired PTP of the write portion of the read/write head using the pole tip burnisher in response to the monitoring and PTP determining circuit determining occurrence of an undesired PTP condition; and a mechanism configured to write to the disk media through the write portion of the read/write head during a PTP test write cycle, wherein the monitoring and PTP determining circuit monitors the read signal during or right after the PTP test write cycle to determine occurrence of an undesired PTP condition, wherein during the PTP test write cycle the mechanism is configured to continuously write to the disk media through the write portion of the read/write head for a predetermined period of time in a portion of the disk media at a data rate that is higher than a data rate used to write data in the portion of the disk media when not in the PTP test write cycle.

2. The system according to claim 1, wherein the corrective action assembly further comprises a burnish controller that limits burnishing of the pole tip of the write portion of the read/write head responsive to a value produced by the monitoring and PTP determining circuit.

3. The system according to claim 2, wherein the burnish controller is configured to iteratively burnish the pole tip of the write portion of the read/write head by burnishing the pole tip with the pole tip burnisher an incremental amount and then retesting for continued occurrence of the undesired PTP condition.

4. The system according to claim 1, wherein during the PTP test write cycle the mechanism is configured to continuously write to the disk media through the write portion of the read/write head for the predetermined period of time with a data rate defined by a 2T flow scan pattern.

5. The system according to claim 1, wherein during the PTP test write cycle the mechanism is configured to continuously write to the disk media through the write portion of the read/write head for the predetermined period of time in an outer diameter portion of the disk media.

6. A system for identifying and correcting undesired pole top protrusion (PTP) of a write portion of a read/write head that is configured to transfer data to and from a disk media in a hard disk, the system comprising:
 a high fly write monitoring circuit that monitors for occurrence of a high fly write (HFW) condition of the read/write head, wherein the high fly write monitoring circuit comprises a low pass filter that filters a read signal from the read/write head reading the disk media so as to remove high frequency signals unrelated to air bearing frequency resonance and generate a filtered read signal;
 a PTP determining circuit that determines based on the filtered read signal when occurrence of a HFW condition monitored by the monitoring circuit is indicative of an undesired PTP condition; and
 a corrective action assembly that comprises a pole tip burnisher and is configured to correct undesired PTP of the write portion of the read/write head using the pole tip burnisher in response to the PTP determining circuit determining occurrence of an undesired PTP condition, wherein the PTP determining circuit comprises a threshold detector that detects when the low frequency signals of the filtered read signal related to air bearing frequency resonance reach a defined threshold that is indicative of an undesired PTP condition.

7. The system according to claim 6, further comprising a read channel that receives a read signal from the read/write head reading the disk media, the read channel comprising the high fly write monitoring circuit, and wherein the high fly write monitoring circuit monitors the read signal for occurrence of a HFW condition of the read/write head.

8. The system according to claim 6, wherein the threshold detector is activated when writing data through the read/write head to the disk media.

9. A system for identifying and correcting undesired pole top protrusion (PTP) of a write portion of a read/write head that is configured to transfer data to and from a disk media in a hard disk, the system comprising:
 a high fly write monitoring circuit that monitors for occurrence of a high fly write (HFW) condition of the read/write head;
 a PTP determining circuit that determines when occurrence of a HFW condition monitored by the monitoring circuit is indicative of an undesired PTP condition;
 a corrective action assembly that comprises a pole tip burnisher and is configured to correct undesired PTP of the write portion of the read/write head using the pole tip burnisher in response to the PTP determining circuit determining occurrence of an undesired PTP condition; and
 a mechanism configured to write to the disk media through the write portion of the read/write head during a PTP test write cycle, wherein the high fly write monitoring circuit monitors for occurrence of a HFW condition of the read/write head shortly after conclusion of the PTP test write cycle, wherein during the PTP test write cycle the mechanism is configured to continuously write to the disk media through the write portion of the read/write head for a predetermined period of time in a portion of the disk media at a data rate that is higher than a data rate used to write data in the portion of the disk media when not in the PTP test write cycle.

10. The system according to claim 9, wherein the corrective action assembly further comprises a burnish controller that limits burnishing of the pole tip of the write portion of the read/write head responsive to a value produced by the PTP determining circuit.

11. The system according to claim 10, wherein the burnish controller is configured to iteratively burnish the pole tip of the write portion of the read/write head by burnishing the pole tip with the pole tip burnisher an incremental amount and then retesting for continued occurrence of the undesired PTP condition.

12. The system according to claim 9, wherein during the PTP test write cycle the mechanism is configured to continuously write to the disk media through the write portion of the read/write head for the predetermined period of time with a data rate defined by a 2T flow scan pattern.

13. The system according to claim 9, wherein during the PTP test write cycle the mechanism is configured to continuously write to the disk media through the write portion of the read/write head for the predetermined period of time in an outer diameter portion of the disk media.

14. A method of making a hard disk, the method comprising:
 monitoring occurrence of a high fly write (HFW) condition of a read/write head in the hard disk by reading a disk media in the hard disk to generate a read signal, low pass filtering the read signal to remove high frequency signals unrelated to air bearing frequency resonance and generate a filtered read signal, and monitoring the filtered read signal for occurrence of a HFW condition;
 determining based on the filtered read signal when a monitored occurrence of a HFW condition is indicative of an undesired pole tip protrusion (PTP) condition of a write portion of the read/write head; and
 burnishing the write portion of the read/write head with a pole tip burnisher in response to determining that an occurrence of the HFW condition is indicative of an undesired PTP condition, wherein said determining comprises detecting with a threshold detector when the low frequency signals of the filtered read signal related to air bearing frequency resonance reaches a defined threshold that is indicative of an undesired PTP condition.

15. The method according to claim 14, wherein detecting with a threshold detector when the filtered read signal reaches a defined threshold that is indicative of an undesired PTP condition is activated when data is written by the read/write head to the disk media.

16. A method of making a hard disk, the method comprising:
    monitoring occurrence of a high fly write (HFW) condition of a read/write head in the hard disk:
    determining when a monitored occurrence of a HFW condition is indicative of an undesired pole tip protrusion (PTP) condition of a write portion of the read/write head;
    burnishing the write portion of the read/write head with a pole tip burnisher in response to determining that an occurrence of the HFW condition is indicative of an undesired PTP condition; and
    writing data on a disk media in the hard disk during a PTP test write cycle wherein monitoring occurrence of a HFW condition of the read/write head is carried out shortly after conclusion of the PTP test write cycle, wherein writing data on the disk media during the PTP test write cycle comprises writing the data continuously through the write portion of the read/write head for a predetermined period of time in a portion of the disk media at a data rate that is higher than a data rate used to write data in the portion of the disk media when not in the PTP test write cycle.

17. The method according to claim 16, further comprising:
    limiting burnishing of the pole tip of the write portion of the read/write head.

18. The method according to claim 17, further comprising:
    iteratively burnishing the pole tip an incremental amount and then retesting for continued occurrence of the undesired PTP condition.

19. The method according to claim 16, wherein writing data on the disk media during the PTP test write cycle comprises writing the data at a rate defined by a 2T flow scan pattern.

20. The method according to claim 16, wherein writing data on the disk media during the PTP test write cycle comprises continuously writing to the disk media through the write portion of the read/write head for the predetermined period of time in an outer diameter portion of the disk media.

* * * * *